United States Patent
Gietzen et al.

(10) Patent No.: US 7,581,521 B2
(45) Date of Patent: Sep. 1, 2009

(54) DRIVING AUTHORISATION SYSTEM COMPRISING AN ELECTRONIC IMMOBILISER FUNCTION

(75) Inventors: Staas Gietzen, Sternenfels (DE); Thomas Hartmann, Altdorf (DE); Juergen Luka, Tamm (DE); Sylvain Subileau, Esslingen (DE); Hermann Von Hasseln, Filderstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/064,176

(22) PCT Filed: Jul. 28, 2006

(86) PCT No.: PCT/EP2006/007485

§ 371 (c)(1),
(2), (4) Date: Oct. 3, 2008

(87) PCT Pub. No.: WO2007/019955

PCT Pub. Date: Feb. 22, 2007

(65) Prior Publication Data

US 2009/0063006 A1    Mar. 5, 2009

(30) Foreign Application Priority Data

Aug. 19, 2005   (DE) .................. 10 2005 039 585

(51) Int. Cl.
*B60R 25/04*   (2006.01)
*F02P 11/04*   (2006.01)

(52) U.S. Cl. .................... 123/146.5 B; 123/198 B; 123/179.3; 307/10.3

(58) Field of Classification Search ................ 123/406.58–406.66, 198 B, 146.5 B, 179.3; 307/10.3

See application file for complete search history.

(56) References Cited

U.S. PATENT DOCUMENTS

| | | | | | |
|---|---|---|---|---|---|
| 4,037,577 | A | * | 7/1977 | Gallo | 123/406.6 |
| 5,188,069 | A | * | 2/1993 | Fiorenza, II | 123/146.5 B |
| 5,222,468 | A | * | 6/1993 | Korenaga | 123/198 B |
| 5,492,087 | A | * | 2/1996 | Rolland, Jr. | 123/146.5 B |
| 5,570,016 | A | | 10/1996 | Schroeder et al. | |
| 5,615,649 | A | | 4/1997 | Yung | |
| 5,939,797 | A | * | 8/1999 | Konno et al. | 307/10.3 |
| 6,401,207 | B1 | * | 6/2002 | Funakoshi et al. | 713/182 |
| 6,629,050 | B2 | * | 9/2003 | Modgil | 702/73 |
| 7,289,932 | B2 | * | 10/2007 | Woody | 702/163 |

FOREIGN PATENT DOCUMENTS

| | | |
|---|---|---|
| DE | 43 36 212 A1 | 4/1995 |
| DE | 100 06 300 A1 | 8/2001 |

* cited by examiner

*Primary Examiner*—Erick Solis
(74) *Attorney, Agent, or Firm*—Crowell & Moring LLP

(57) ABSTRACT

A driving authorization system comprises an electronic immobilizer function which is coupled to a rotary shaft sensor. The rotary shaft sensor senses the position and/or rotational speed of the rotary shaft by means of a pickup wheel arranged on a rotary shaft, and transmits that information to a vehicle control unit which enables the electronic immobilizer function. According to the invention, the pickup wheel comprises a predefined number of teeth which are arranged distributed along the circumference of the pickup wheel according to a code, and an encoded rotational speed signal which is picked up by the rotary shaft sensor and can be decoded by the vehicle control unit. The vehicle control unit enables the immobilizer function only after successful decoding of the encoded rotational speed signal. A synchronization time for detecting a specific position of the rotary shaft is part of the encoded rotational speed signal.

10 Claims, 1 Drawing Sheet

DRIVING AUTHORISATION SYSTEM COMPRISING AN ELECTRONIC IMMOBILISER FUNCTION

This application is a national stage of PCT International Application No. PCT/EP2006/007485, filed Jul. 28, 2006, which claims priority under 35 U.S.C. §119 to German Patent Application No. 10 2005 039 585.6, filed Aug. 19, 2005, the entire disclosure of which is herein expressly incorporated by reference.

BACKGROUND AND SUMMARY OF THE INVENTION

The invention relates to a driving authorization system having an electronic immobilizer function.

In conventional driving authorization systems it is possible to bypass an electronic immobilizer function by exchanging components, for example control units which are involved in the driving authorization system. For this reason, in order to increase security, an electronic immobilizer function can be coupled mechatronically to a sensor system or actuator system which is difficult to access on the internal combustion engine.

German patent document DE 43 36 212 C2 discloses a pickup arrangement for detecting cylinders in an internal combustion engine. For the purpose of detecting a defined position of a crankshaft in the internal combustion engine, the system includes a pickup disc, a reference mark which is arranged on the pickup disc, a sensor which is assigned to the pickup disc and a control device which evaluates the signal of the sensor. The reference mark characterizes a predefined position of the crankshaft which is assigned to the reference mark. In order to encode the internal combustion engine, the reference mark is assigned to a crankshaft position which is specific to the internal combustion engine.

Germany patent document DE 100 06 300 C2 describes an immobilizer for a vehicle which is driven by an internal combustion engine with an ignition signal transmitter coil which interacts with a pickup disc which is coupled to the crankshaft of the engine. The immobilizer comprises a circuit arrangement has (a circuit breaker or a short circuit switch) and a circuit activation circuit which closes the circuit breaker and opens the short circuit switch if it receives a predefined signal. It is embodied as an undetachable circuit unit with the ignition signal transmitter coil.

U.S. Pat. No. 5,570,016 discloses a method and apparatus for detecting the angular position of a crankshaft, which permit a rapid engine start. A combination of a pickup wheel and a sensor generates an analog signal that is converted into a digital output signal with 24 bits representing a 360° rotation of the crankshaft. Each bit represents a specific angular position of the crankshaft and in each case six successive bits of the repeating digital output sequence of 24 bits form a unique pattern. By monitoring the first six generated bits during a switch on process, which corresponds to a 90° rotation of the crankshaft, the angular position of the crankshaft can then be determined, permitting faster starting of the engine.

U.S. Pat. No. 5,615,649 discloses an engine security system with a security component that is adapted to receive a sequence of timing pulses generated as a function of the engine speed. After an enable code has been received from the timing pulse sequence, the security component generates an ignition pulse sequence which is synchronized with the engine speed. The ignition pulse sequence is applied to the ignition system of the engine in order to generate ignition sparks. The pulses of the timing pulse sequence occur at various times compared to the pulses of the ignition pulse sequence, and contain an encrypted identity code.

One object of the invention is to provide a driving authorization system having an electronic immobilizer function which is connectable to a vehicle assembly by a mechatronic connection, thereby providing improved protection against theft.

This and other objects and advantages are achieved by the driving authorization system according to the invention, in which a pickup wheel arranged on a rotary shaft has a predefined number of teeth are arranged along its circumference by means of encoding. The teeth generate an encoded rotational speed signal which is picked up by a rotary shaft sensor and can be decoded by a vehicle control unit in order to acquire information about the position and/or rotational speed of the rotary shaft. The vehicle control unit enables the electronic immobilizer function only after successful decoding of the encoded rotational speed signal. A synchronization time for detecting a specific position of the rotary shaft is part of the encoded rotational speed signal. Thus, without successfully decoding the encoded rotational speed signal, the vehicle control unit cannot synchronize the rotary shaft position and an associated vehicle system; for example it cannot synchronize a crankshaft position with injection times of an injection system.

By including the specific synchronization time in the encoding of the pickup wheel, attempts at manipulation are made considerably more difficult. The synchronization time can be used, for example, for synchronizing an internal combustion engine (i.e., for detecting a top dead center of a first cylinder). In this way, in contrast to conventional pickup wheels which have a corresponding visible marking (for example, a gap), an assignment of a specific rotary position of the rotary shaft to functions of an associated vehicle system can no longer be detected. As a result, it is no longer possible, for example, to assign the crankshaft position and the top dead center of the first cylinder from the outside without decoding.

In addition, synchronization of the rotary shaft with the associated vehicle system can occur only given knowledge of the encoding of the pickup wheel. Since the pickup wheel which is encoded mechanically by the distribution of teeth, and has the purpose of sensing the rotational speed, cannot be manipulated without considerable expenditure of materials and time, protection against theft is advantageously improved. In addition, the electronic immobilizer function of the driving authorization system is advantageously coupled to the associated vehicle assembly, for example to an internal combustion engine and/or to an automatic transmission, via the mechanically encoded pickup wheel.

In one advantageous development of the driving authorization system, the encoding along the circumference of the pickup wheel is divided into a predefinable number of segments which can each be unambiguously detected. Such encoding advantageously permits very rapid synchronization of the rotary shaft with the associated vehicle system, since less than one complete rotation of the rotary shaft is sufficient for synchronization. The speed of the synchronization is dependent on the size and number of the segments and can be increased by a relatively large number of segments or by relatively small segments.

In one embodiment of the driving authorization system according to the invention, at least two pickup wheels which are arranged on various rotary shafts can be evaluated by the associated vehicle control units in order to carry out mutual authentication. Encoding information and decoding information from various pickup wheels can be exchanged between two different vehicle control units for the purpose of mutual authentication in, for example, encrypted form via an electronic bus system. As a result, the decoding algorithms which are matched to the mechanical encoding of the associated pickup wheels can advantageously be mutually exchanged, monitored and, where necessary completed, so that theft protection is improved further.

In a further embodiment of the driving authorization system according to the invention, a pickup wheel for sensing the position and/or rotational speed of an associated rotary shaft can be arranged, for example, on a crankshaft and/or on at least one rotary shaft in an automatic transmission. A pickup wheel which is arranged on the crankshaft transmits the sensed position and/or rotational speed of the crankshaft to, for example, a vehicle control unit which is embodied as an engine control unit. A pickup wheel which is arranged on at least one rotary shaft in the automatic transmission transmits the sensed position and/or rotational speed of the associated pickup shaft to, for example, a vehicle control unit in the form of a transmission control unit. This has the advantage that even exchanging the internal combustion engine and/or the automatic transmission as an attempt at manipulation will not allow the respective vehicle to be used without authorization.

In a further embodiment of the driving authorization system according to the invention, the associated vehicle control unit decodes the encoded rotational speed signal which is picked up by the rotary shaft sensor and transmitted, with a decoding algorithm which can be enabled and activated by an authorized authentication element. As a result, the decoding algorithm which is matched to the mechanical encoding of the pickup wheel can advantageously be enabled only by an authentication element which is assigned to the vehicle. As a result protection against theft is enhanced.

In a further embodiment of the driving authorization system according to the invention, an enable signal for the decoding algorithm in the respective vehicle control unit is generated by a vehicle control unit which is embodied as an electronic ignition lock, after successful authentication. For the purpose of authentication, the electronic ignition lock communicates with the portable authentication element via a communication link. The enable signal which is generated in the electronic ignition lock can be transmitted in encoded form to the engine control unit via a data bus and decoded again by the engine control unit in order to enable the decoding algorithm. As a result, it is possible to implement a two-stage driving authorization checking system which electronically checks the authentication in a first stage and, in a second stage, checks the mechanically encoded coupling of the electronic immobilizer function to the corresponding vehicle assembly, such as the internal combustion engine and/or the automatic transmission.

In addition, information can be transmitted from at least one other vehicle control unit and/or from the authentication element to the vehicle control unit, which uses such information to decode the encoded rotational speed signal of an associated pickup wheel. This advantageously permits the necessary keys for decoding the mechanically encoded pickup wheels to be distributed to the entire electronic implementation of the immobilizer function in the vehicle and in the portable authentication element.

Other objects, advantages and novel features of the present invention will become apparent from the following detailed description of the invention when considered in conjunction with the accompanying drawings.

DETAILED DESCRIPTION OF THE DRAWINGS

Figure 1:
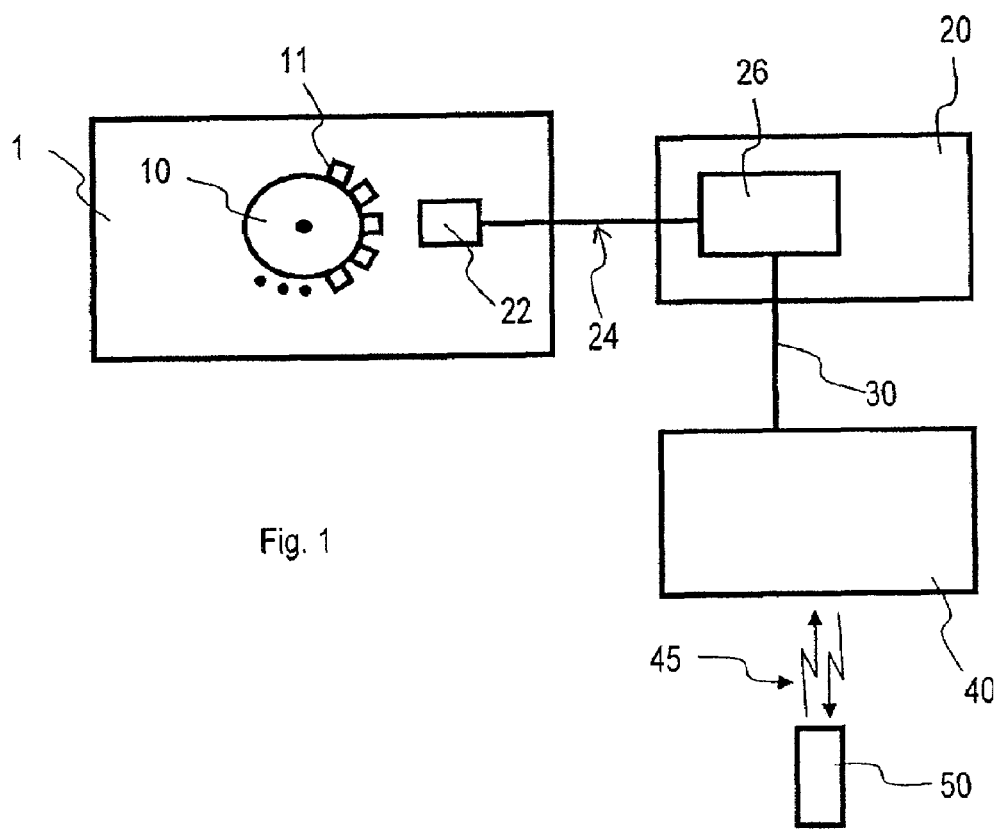
FIG. 1 is a schematic block diagram of an exemplary embodiment of a driving authorization system according to the invention, comprising an electronic immobilizer function.

In the drawings, identical reference symbols denote elements or components which carry out identical or analogous functions.

As is apparent from FIG. 1, an exemplary embodiment of a driving authorization system with an electronic immobilizer function according to the invention comprises a crankshaft sensor 22 which senses the position and/or rotational speed of the crankshaft by means of a pickup wheel 10 arranged on a crankshaft of an internal combustion engine 1, and transmits the position and/or rotational speed as an encoded rotational speed signal 24 to a vehicle control unit 20 in the form of an engine control unit. The pickup wheel 10 comprises a predefined number of teeth 11, (five of which are illustrated by way of example) which are distributed along the circumference of the pickup wheel 10 according to encoding. They generate an encoded rotational speed signal 24 which is picked up by the crankshaft sensor 22 and decoded by the engine control unit 20.

The encoding at the pickup wheel 10 can be implemented by variation in the width of the teeth 11, their distance from one another and/or their height. For example, a variation in the width and/or the distance between the teeth 11 brings about frequency modulation of the signal sensed by the crankshaft sensor 22. Variation in the height of the teeth 11 implements amplitude modulation of the signal sensed by the crankshaft sensor 22. It is also possible to superimpose frequency and amplitude modulation.

The engine control unit 20 decodes the encoded rotational speed signal 24 which has been received from the crankshaft sensor 22, using a decoding algorithm 26 which is enabled and activated by an authorized authentication element 50 by means of an enable signal. The enable signal for the decoding algorithm 26 in the engine control unit 20 is generated by a vehicle control unit 40 which is embodied as an electronic ignition lock, after a successful authentication process, and is, for example, transmitted in encoded form to the engine control unit 20 via an electronic data bus 30. For the purpose of authentication, the electronic ignition lock 40 communicates with the portable authentication element 50 via a corresponding communication link 45. The communication link 45 between the electronic ignition lock 40 and the portable authentication element 50 can, as is known from the prior art, be set up, for example, by transmission signals in the infrared frequency range and/or in the ultrasonic frequency range and/or in the high frequency range.

The decoding algorithm 26, which is matched to the mechanical encoding of the pickup wheel 10, decodes the encoded rotational speed signal 24 from the crankshaft sensor, and provides the engine control unit 20 with the information about the position and/or rotational speed of the crankshaft which is necessary to operate the internal combustion engine 1. The engine control unit 20 can enable the immobilizer function only after successful decoding of the encoded rotational speed signal 24. An engine control unit which has been exchanged without authorization cannot decode the encoded rotational speed signal 24 since the decoding algorithm 26 in the exchanged engine control unit is not matched to the mechanical encoding of the pickup wheel 10 so that the decoding algorithm 26 in the exchanged engine control unit 20 cannot decode the encoded rotational speed signal 24 even if a manipulated enable signal for the decoding algorithm 26 is present.

The encoding and corresponding decoding and/or the decoding method 26 can be carried out using currently known cryptographic methods such as, for example, the public private key method. For this purpose, a pair of keys with a corresponding public key and a corresponding private key are generated. The encoding of the pickup wheel 10 (and therefore of the rotational speed signal 24 which is sensed by the crankshaft sensor 22) is done by means of the public key. The decoding of the rotational speed signal 24 can, however, be done only with the aid of the corresponding private key which is stored, for example, in the engine control unit 20.

The driving authorization system according to the invention couples the electronic immobilizer function to the internal combustion engine 1 via the mechanically encoded pickup wheel 10, the crankshaft sensor 22, which is embodied for example as a differential Hall sensor, sensing the rotational speed of the internal combustion engine 1 via the pickup wheel 10, and sensing the position of the crankshaft. The pickup wheel 10 comprises, for example, a perforated plate which is welded onto a starter ring and has, for example, 60 teeth 11 which are sensed by the crankshaft sensor 22. A predefined synchronization point for detecting a first cylinder of the internal combustion engine 1 or a predefined position of the crankshaft can be determined by the decoding of the encoded rotational speed signal 24. The rotational speed signal 24 is indispensable for the synchronization of the crankshaft position and injection times which is carried out in the engine control unit 20. Without corresponding decoding of this rotational speed signal 24 in the engine control unit 20, the internal combustion engine 1 cannot be started, or at least cannot be started correctly.

The predetermined synchronization point, which denotes a position of the crankshaft or of the first cylinder, synchronizes the measured signal with the crankshaft position. It is encoded as additional information using the encoding of the pickup wheel 10, and is therefore stored in the geometry of the pickup wheel 10. An explicit emphasized marking for synchronizing the crankshaft position with the measured signal, as is implemented on a pickup wheel according to the prior art, is therefore no longer necessary. As a result, the driving authorization system according to the invention achieves a higher security level: even if the code checking function is switched off by a third party the synchronization point for the position of the crankshaft is not known; and without knowledge of the encoding it is also impossible to determine it.

In an alternative embodiment of the invention, effective encoding includes dividing the pickup wheel encoding into a predefined number of segments. For example, the pickup wheel 10 can be divided into five segments, each with twelve teeth 11, so that a total of 60 teeth 11 are arranged along the circumference of the pickup wheel 10. In order to determine the synchronization point unambiguously, the individual code segments over the entire circumference of the pickup wheel 10 are selected in a uniquely defined way. In contrast to conventional pickup wheels, which require at least one full rotation of 360° for synchronization, such encoding advantageously permits very rapid synchronization of an associated vehicle assembly, for example of an engine or of an automatic transmission. With the numerical values specified above by way of example it is therefore possible to carry out synchronization after a rotational movement with an angle of less than 144°; and with correspondingly smaller segments even faster synchronization is possible. This effective encoding also permits faster checking of the code stored in the vehicle control unit 20, and in the example above this is possible at the latest after a rotational angle of 144°.

A further advantage of the segmented encoding is the possibility of being able to export individual segments from the memory of the associated vehicle control unit 20 into other vehicle control units 40 and/or into the portable authentication element 50, so that an individual vehicle control unit 20 together with the associated pickup wheel 10 is not able to start the internal combustion engine 1 unless the other correct vehicle control unit 40 and/or the authentication element 50 are involved. This further increases the threshold for possible manipulation attempts.

Alternatively it is possible to store the entire encoding information for decoding the rotational speed signal 24 of the associated pickup wheel 10 electronically in the portable authentication element 50. This would have the advantage that no encoding information for decoding the associated pickup wheel 10 would be permanently stored in the vehicle control units 20, 40. Rather, it would be transmitted dynamically into the associated vehicle control units 20, 40 by the portable authentication element 50 when the vehicle is started. This arrangement prevents the encoding information from being read out from the vehicle control units 20, 40 when the vehicle is stationary. In known immobilizer systems, the authentication elements 50 which are embodied as an ignition key are generally equipped with a secure, (i.e., nonreadable or manipulation proof) hardware memory so that it is easily possible to store the encoding information in the manipulation proof hardware memory.

Figure 2:
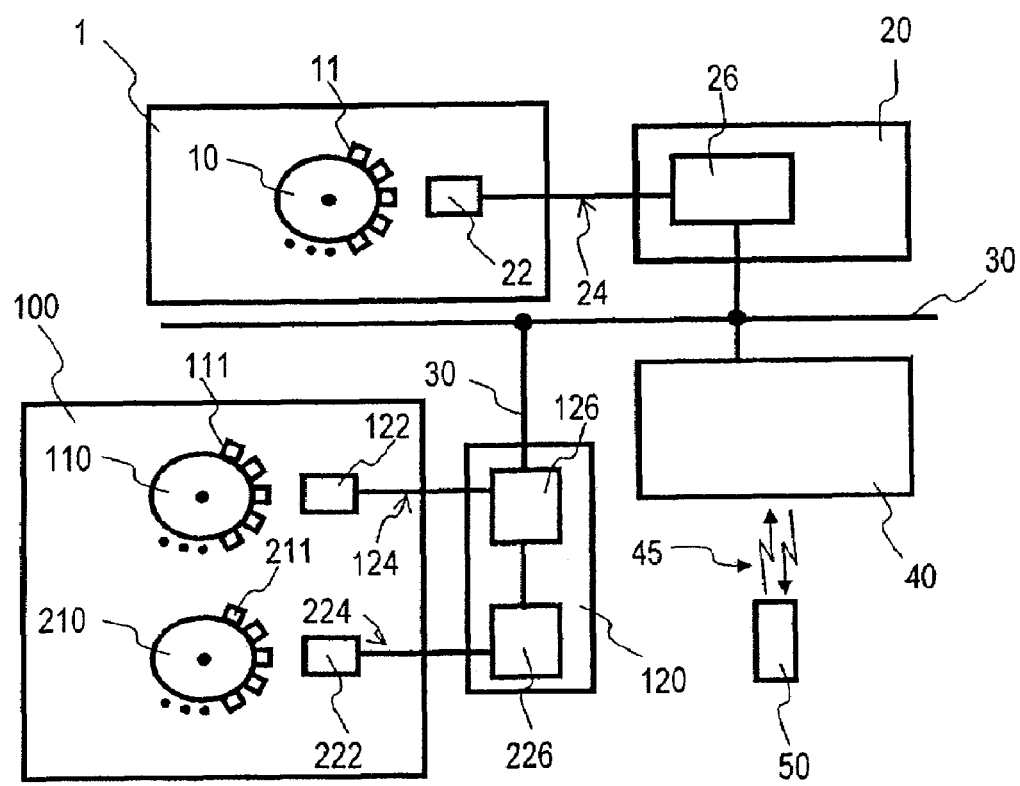
FIG. 2 is a schematic block diagram of a further exemplary embodiment of a driving authorization system comprising an electronic immobilizer function.

FIG. 2 shows a further exemplary embodiment of the driving authorization system according to the invention having an electronic immobilizer function. In addition to the components described with reference to FIG. 1, it includes two rotary shaft sensors 122, 222 which sense the position and/or rotational speed of respective associated rotary shafts by means of a pickup wheel 110, 210 arranged on a rotary shaft of an automatic transmission 100. The position and/or rotational speed is transmitted as encoded rotational speed signals 124, 224 to a vehicle control unit 120 in the form of a transmission control unit. Analogously to the pickup wheel 10 which is arranged on the crankshaft, each of the pickup wheels 110, 210 is a predefined number of teeth 111 or 211, five of which are illustrated by way of example. The teeth 111, 211 are also distributed along the circumference of the respective pickup wheel 110, 210 in an encoded manner, so that they generate encoded rotational speed signals 124, 224. The latter signals are picked up by the rotary shaft sensors 122, 222 and decoded by the transmission control unit 120 using the decoding algorithms 126, 226. Analogously to the engine control unit 20, the decoding algorithms 126, 226 are enabled and activated by the authorized authentication element 50 by means of the enable signal which is generated in conjunction with the electronic ignition lock 40.

Various rotational speed signals are measured in the automatic transmission 100 with an electronic controller and are made available as an electronic signal to the associated transmission control unit 120 so that it is possible to integrate a plurality of different rotary shafts with encoded pickup wheels 110, 210 of the automatic transmission 100 into the electronic immobilizer function. Since these rotational speed signals 124, 224 are indispensable for controlling the automatic transmission 100, unauthorized operation of the vehicle can also be prevented by means of a blockage of the automatic transmission 100.

Therefore, in the event of a manipulation attempt it would be necessary not only to exchange an electronic vehicle control unit 120, which is integrated, for example, in the electronic implementation of the entire immobilizer function of the vehicle, but also one or more pickup wheels 110, 210 within the automatic transmission 100. This makes possible manipulation attempts considerably more difficult, since in order to manipulate the pickup wheels it is necessary to disassemble the automatic transmission.

Furthermore, encoding of one or more rotational speed signals 124, 224 and evaluating them in the transmission control unit 120 permits mutual authentication, between the transmission control unit 120 and the engine control unit 20, of the encoding information for the pickup wheels 110, 210 arranged in the automatic transmission 100 and for the pickup wheel 10 which is arranged in the internal combustion engine 1 and is evaluated by the engine control unit 20.

This has the further advantage that even exchanging the internal combustion engine 1 and/or the automatic transmission 100 as a manipulation attempt does not make the manipulation attempt successful. In addition, the electronic ignition lock 40 and/or the portable authentication element 50 can be integrated into the mutual authentication process. The exchange of encoding information from the pickup wheels 110, 210, 10 between the automatic transmission 100, the internal combustion engine 1, the ignition lock 40 and/or the authentication element 50 for the purpose of mutual authentication is carried out in encrypted form (for example, by means of the electronic bus system 30) in the vehicle. The encryption can be implemented, for example, by suitable known cryptographic methods which.

One advantage of the invention is that the pickup wheel 10, 110, 210 for sensing the rotational speed cannot be mechanically manipulated without considerable expenditure in terms of materials and time. In particular, in order to carry out manipulation the encoding and/or decoding must be additionally known. The result is an effective driving authorization system which couples the electronic immobilizer function to the internal combustion engine 1 and/or the automatic transmission 100.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A driving authorization system having an electronic immobilizer coupled to a rotary shaft sensor that senses at least one of position and rotational speed of the rotary shaft by means of a pickup wheel arranged thereon and transmits said at least one of position and rotational speed to a vehicle control unit which enables the electronic immobilizer function; wherein:

the pickup wheel comprises a predefined number of teeth which are distributed along the circumference of the pickup wheel according to code, and generate an encoded rotational speed signal that is picked up by the rotary shaft sensor and decoded by the vehicle control unit;

the vehicle control unit enables the immobilizer function only after successful decoding of the encoded rotational speed signal; and a synchronization time for detecting a specific position of the rotary shaft is part of the encoded rotational speed signal.

2. The driving authorization system as claimed in claim 1, wherein the distribution of the teeth along the circumference of the pickup wheel is divided into a predefinable number of segments which can each be unambiguously detected.

3. The driving authorization system as claimed in claim 1, comprising at least two pickup wheels which are arranged on different rotary shafts can be evaluated by the associated vehicle control units for mutual authentication.

4. The driving authorization system as claimed in claim 3, wherein encoding information from various pickup wheels is exchanged between two different vehicle control units for mutual authentication, in an encrypted form via an electronic bus system.

5. The driving authorization system as claimed in claim 1, wherein the pickup wheel for sensing at least one of position and rotational speed is arranged on at least one of a crankshaft of an internal combustion engine and a rotary shaft in an automatic transmission.

6. The driving authorization system as claimed in claim 5, wherein a pickup wheel arranged on the crankshaft transmits sensed position or rotational speed of the crankshaft to a vehicle control unit which is embodied as an engine control unit.

7. The driving authorization system as claimed in claim 5, wherein a pickup wheel which is arranged on at least one rotary shaft in the automatic transmission transmits sensed position or rotational speed of the associated pickup wheel to a vehicle control unit which is embodied as a transmission control unit.

8. The driving authorization system as claimed in claim 1, wherein the associated vehicle control unit decodes the encoded rotational speed signal from the rotary shaft sensor with a decoding algorithm that can be enabled and activated by an authorized authentication element.

9. The driving authorization system as claimed in claim 8, wherein:

an enable signal for the decoding algorithm can be generated in the associated vehicle control unit by a vehicle control unit which is embodied as an electronic ignition lock, after successful authentication; and for the purpose of authentication, the electronic ignition lock communicates with the portable authentication element via a communication link.

10. The driving authorization system as claimed in claim 1, wherein encoding information can be transmitted from at least one other vehicle control unit or from the authentication element to the vehicle control unit which uses that information to decode the encoded rotational speed signal of an associated pickup wheel.

* * * * *